United States Patent
Niimi et al.

(10) Patent No.: US 6,658,517 B1
(45) Date of Patent: Dec. 2, 2003

(54) COMMUNICATION CONTROLLING APPARATUS AND SERIAL BUS MANAGING APPARATUS

(75) Inventors: Makoto Niimi, Tokyo (JP); Tatsuo Bando, Tokyo (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 506 days.

(21) Appl. No.: 09/613,630

(22) Filed: Jul. 11, 2000

(30) Foreign Application Priority Data

Aug. 10, 1999 (JP) .......................................... 11-226300

(51) Int. Cl.[7] .............................................. G06F 13/00
(52) U.S. Cl. ...................................................... 710/305
(58) Field of Search ........................ 710/305; 709/245, 709/226, 239, 224

(56) References Cited

U.S. PATENT DOCUMENTS

| 6,378,000 | B1 | * | 4/2002 | Akatsu et al. | ............... | 709/245 |
| 6,496,862 | B1 | * | 12/2002 | Akatsu et al. | ............... | 709/224 |
| 6,505,255 | B1 | * | 1/2003 | Akatsu et al. | ............... | 709/239 |
| 6,523,064 | B1 | * | 2/2003 | Akatsu et al. | ............... | 709/226 |

FOREIGN PATENT DOCUMENTS

| EP | 0930747 A1 | * | 7/1999 | ........... H04L/12/24 |
| JP | 7-250070 | | 9/1995 | |
| JP | 9238158 | | 9/1997 | |
| JP | 10173900 | | 6/1998 | |
| JP | 11168489 | | 6/1999 | |
| JP | 11170632 | | 6/1999 | |

OTHER PUBLICATIONS

English Language Abstract for JP Appl. No. 9–238158.
English Language Abstract for JP Appl. No. 10–173900.
English Language Abstract for JP Appl. No. 11–170632.
English Language Abstract of JP–7–250070.
English Language Abstract of JP–11–168489.

* cited by examiner

Primary Examiner—Paul R. Myers
(74) Attorney, Agent, or Firm—Greenblum & Bernstein, P.L.C.

(57) ABSTRACT

A communication controlling apparatus, which is connected to a telephone line and a serial bus, comprises a mapping table, which brings a fixed address, which a terminal device possesses, into correspondence with a node ID assigned to a terminal device connected to the current serial bus. Then, the node ID of the terminal device, serving as a recipient of data received from the telephone line, is obtained from the mapping table, and the received data from the line is transmitted to the terminal device via the serial bus using the obtained node ID.

17 Claims, 10 Drawing Sheets

| SUBADDRESS | NODE ID | NODE UNIQUE ID | DEVICE ATTRIBUTE | DATA CHARACTERISTIC |
|---|---|---|---|---|
| C2 | C1 | C3 | C4 | C5 |
|  |  |  |  |  |
|  |  |  |  |  |
|  |  |  |  |  |
|  |  |  |  |  |

FIG. 3

COMMUNICATION CONTROLLING APPARATUS AND SERIAL BUS MANAGING APPARATUS

BACKGROUND OF THE INVENTION

1. Field of the Invention

The present invention relates to a communication controlling apparatus that transmits data received from a line to a terminal connected to a serial bus (hereinafter referred to as "IEEE1394 bus"), which operates in conformity with IEEE1394, or transmits information sent over IEEE1394 bus from the terminal to the line.

2. Description of the Related Art

In recent years, conversion of electronic equipment to the network system has progressed and not only personal computers (hereinafter referred to as "PC") but also printers, TV sets, digital cameras have been used as network equipment. In accordance with such progression, the media, which the electronic equipment handles, have been largely widened from texts to still images and moving images, and processing of even data with large quantity such as a color image has become possible.

In terms of the above factors, the speedup of network has been desired and attention has been paid to IEEE1394 as a technique that implements the high-speed network. At the present, standardization of protocol, which is based on IEEE1394, is proceeding. As result, the merge of media in which the scanner and printer, namely the PC peripherals, perform direct communications is implemented.

However, in the progression of conversion to the network system, the existing media such as a telephone, facsimile apparatus, remain in the conventional configuration. Interconnection between the existing media such as the telephone, facsimile apparatus and various kinds of media, which are connected to IEEE1394 bus, is not taken into account sufficiently.

SUMMARY OF THE INVENTION

The present invention has been made in consideration of the above-mentioned problem, and an object of the present invention is to provide a communication controlling apparatus that improves the merger between the high-speed/high capacity network and the existing media such as facsimile apparatus and the like and provide a serial bus managing apparatus.

The present invention includes a communication controlling apparatus, which is connected to a telephone line and a serial bus. The communication controlling apparatus comprises a mapping table for correlating a fixed address, which a terminal device possesses, with a node ID assigned to a terminal device, which is currently connected to a serial bus. Then, the present invention obtains a node ID of a terminal device, serving as a recipient of data received from the telephone line, from the mapping table, and transmits the received data from the line to the terminal device via the serial bus using the obtained node ID.

Moreover, the present invention includes a serial bus managing apparatus, which is connected to a serial bus. The serial bus managing apparatus comprises a mapping table for bring a fixed address, which a terminal device possesses, into correspondence with a node ID assigned to a terminal device, which is currently connected to a serial bus. Then, the present invention provides various kinds of information and functions in response to inquiries from the terminal device.

A first aspect of the present invention provides a communication controlling apparatus comprising a mapping table for bring a fixed address, which the terminal device possesses, into correspondence with a node ID assigned to a terminal device, which is connected to a current serial bus, an obtaining section for obtaining a node ID of a reception device, as a recipient of data received via a line, from the mapping table, and a transmitting section for transmitting received data from the line via the serial bus using the obtained node ID.

According to this configuration, since the node ID of the terminal device connected to the current serial bus is managed to be associated with the fixed address of each terminal device, the destination of data with a fixed address designated, which is sent out of the line, can be converted to the node ID and transmitted to the terminal device. Therefore, it is possible to transmit data to the terminal device over the serial bus surely without being influenced by the change in the node ID caused by occurrence of a bus reset.

A second aspect of the present invention provides a terminal device connected to the same serial bus as that of the communication controlling apparatus comprising an inquiring section for sending an inquiry to the communication controlling apparatus about a fixed address of a sender device, a header creating section for creating a transmission header in which the fixed address of sender device obtained from the communication controlling apparatus is embedded as a destination, and a transmitting section for transmitting transmission data to which the generated transmission header is added to the sender via the serial bus.

According to this configuration, the fixed address of the sender device can be obtained from the communication controlling apparatus, and the fixed address of at least the sender device is set to the transmission header. Whereby, even if data is transmitted to the different terminal device due to the change in the node ID caused by occurrence of the bus reset in the course of transmission, it is possible to detect miss-delivery at the terminal device.

A third aspect of the present invention provides a terminal device connected to the same serial bus as that of the communication controlling apparatus comprising a capturing section for temporarily capturing data in which the same node ID as that of the terminal device is set as an destination from a data stream of the serial bus, an inquiring section for sending an inquiry to the communication controlling apparatus about a fixed address of the terminal device when data is temporarily captured from the serial bus, and a capturing section for comparing a fixed address of the terminal device, which is obtained from the communication controlling apparatus, with a fixed address of a sender, which is embedded in a transmission header, to capture the compared fixed address as data directing to the terminal device when the address match occurs.

According to this configuration, when data is temporarily captured from the serial bus, there is provided the mapping table, which brings the data into correspondence with communication control node ID, the node ID of the terminal device, serving as a recipient of data received from the telephone line is obtained from the mapping table, and the received from the line is transmitted to the device via the serial bus using the obtained node ID.

Moreover, in the present invention, there is provided a mapping, which brings a fixed address, which a terminal device possesses, into correspondence with a node ID assigned to a terminal device connected to the current serial bus, in a serial bus managing apparatus connected to the serial bus, so that various kinds of information and functions are provided in response to an inquiry from the terminal device.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 3 is a configuration view of a mapping table set in the above facsimile apparatus;

DETAILED DESCRIPTION OF THE PREFERRED EMBODIMENTS

The following will specifically explain the embodiment of the present invention with reference to the drawings attached herewith.

Figure 1:
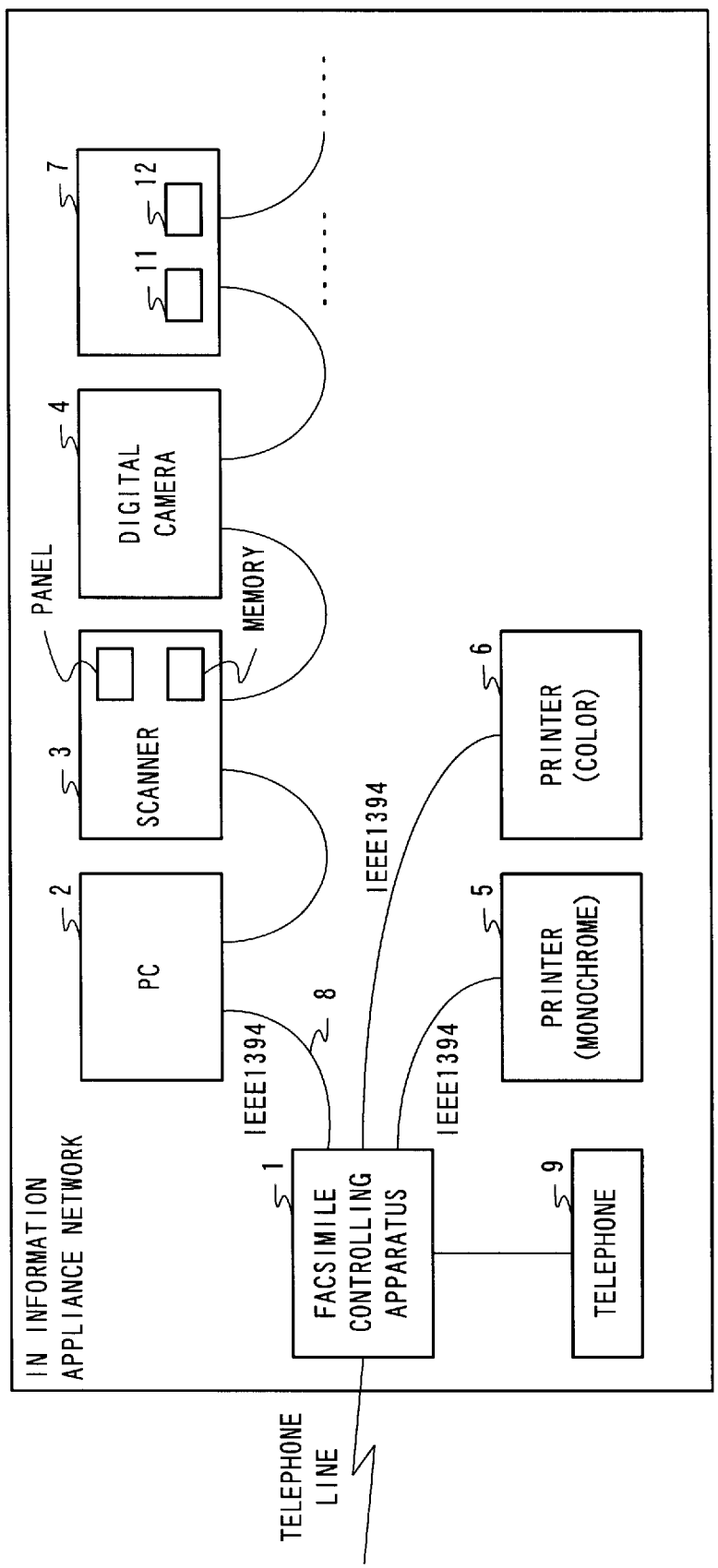
FIG. 1 is a system configuration view of an information appliance network system according to one embodiment of the present invention.

FIG. 1 is a system configuration view of an information appliance network according to one embodiment of the present invention. In the information appliance network shown in the figure, a PC 2, which is the information appliance, a scanner 3, a digital camera 4, a printer 5 (monochrome), a printer 6 (color), and other device 7 are connected to a facsimile controlling apparatus 1, which functions as a communication controlling apparatus of the present invention, via IEEE1394 bus 8.

The facsimile controlling apparatus 1 has various kinds of functions such as an isochronous resource manager, a cycle master, a bus manager, and the like.

The isochronous resource manager controls all conditions relating to isochronous transfer, for example, the device over IEEE1394 bus 8 guarantees the frequency band to be used in isochronous transfer.

The cycle master assigns time slots for transmission to all devices that request data transfer over IEEE1394 bus 8, and controls timing of data transfer.

The bus manager manages the devices connected to IEEE1394 bus 8 using a node ID, and executes reassignment of node IDs of all devices connected to IEEE1394 bus 8 when a device is newly connected to IEEE1394 bus 8 and power is turned on/off (hereinafter referred to as "bus reset").

PC 2, which is the terminal device for transiting data via IEEE1394 bus 8, scanner 3, digital camera 4, printer 5 (monochrome), printer 6 (color), and other device 7, each has a function that performs isochronous transfer based on IEEE1394 and uses isochronous transfer in transferring an image. Reference numeral 9 denotes a general analog telephone. In this embodiment, each of the scanner 3, digital camera 4 and electronic device 7 has a panel section 11 for inputting a destination (recipient subaddress) and an image memory 12 for storing captured image data.

Figure 2:
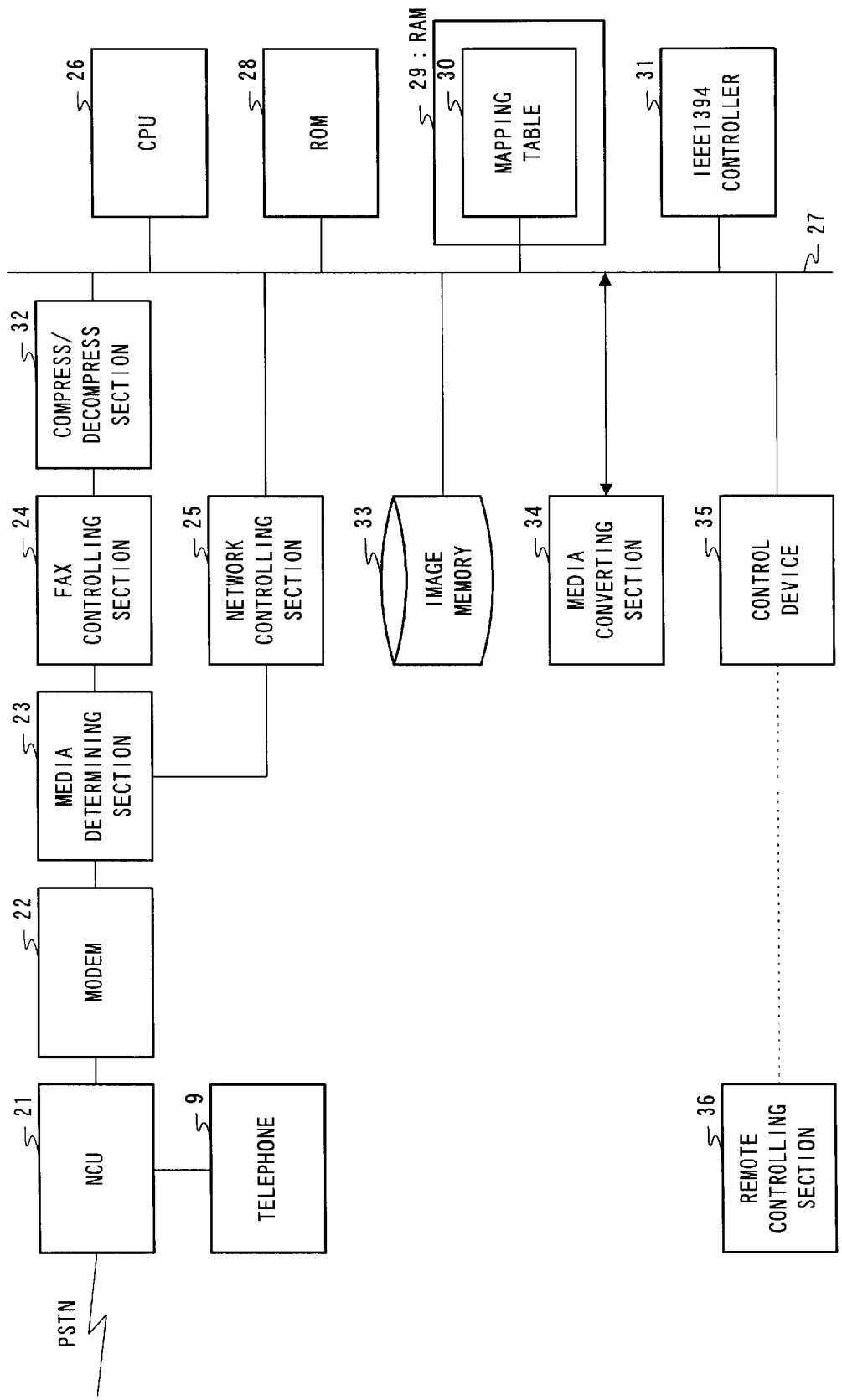
FIG. 2 is a functional block diagram of a facsimile controlling apparatus in the above embodiment.

FIG. 2 is the functional block diagram of facsimile controlling apparatus 1 in the above embodiment. The facsimile controlling apparatus 1 is connected to public switched telephone network (PSTN) via an NCU (Network Control Unit) 21. The NCU 21 performs selection between the telephone 9 and the main system of the apparatus. The NCU 21 is connected to a media determining section 23 via a modem 22. The modem 22 executes communication control in accordance with analog/digital conversion and communication protocol. The media determining section 23 performs sorting of facsimile signals and other signals used by another protocol. The facsimile signals sorted by the media determining section 23 are input to a FAX controlling section 24, and the other signals used by another protocol are input to a network controlling section 25. In the case of transmitting the signals to the telephone line from the FAX controlling section 24 or the network controlling section 25, the signals output from the FAX controlling section 24 or the network controlling section 25 are input to the modem 22 through the media determining section 23.

A CPU 26 manages the operation of each of the structural components built in the facsimile apparatus 1, and executes communication control to be described later. ROM 28, RAM 29, and IEEE1394 controller 30 are connected to CPU 26 via a bus 27.

ROM 28 stores a program for executing communication control to be described later and the other programs, and setting data. RAM 29 provides a work area at a processing execution time, and a storage area for a mapping table 30.

The mapping table 30 is a table for performing mapping between address of data received from the outer section and the devices over IEEE1394 bus 8. An IEEE1394 controller 31 is a controller for performing an interface to IEEE1394 bus so as to control data input/output based on protocol of IEEE1394. The facsimile controlling apparatus 1 is connected to IEEE1394 bus 8 by IEEE1394 controller 31.

Moreover, compression/decompression section 32, network controlling section 25, image memory 33, media converting section 34, and control section 35 are connected to the bus 27 in the facsimile controlling apparatus 1. The compression/decompression section 32 comprises a decompressing function that decompresses a compressed image and a compressing function that compresses a non-compressed image.

The media converting section 34 is a functional block for converting an image of a certain media to one of another media. As one of media conversion, for example, there is conversion that converts a monochrome image to a color image. The control section 35 is composed of a panel for inputting various data and instructions from a user including subaddresses of the devices and characteristics. The control section 35 can perform remote control using a remote controlling device 36.

FIG. 3 is a configuration view of a mapping table 30. In a column C1 of node ID, there is registered a node ID, which has been added to each device of all devices connected to IEEE1394 bus 8 at a bus reset time. The node ID is updated every time when the bus reset occurs.

An address (hereinafter referred to as "subaddress"), which has been arbitrarily added by the user when connecting the device to IEEE1394 bus 8, is added to a column C2 of subaddress. The subaddress is an address, which is used when the user designates the device, and which is composed of only numeric figures. An inherent subaddress is added to each device connected to IEEE1394 bus 8.

A Node Unique ID (EUI-64), which is included in configuration ROM of each device, is registered to a column C3 of node identification information. The node unique ID is an ID number inherent in each device, and is expressed by data of 64 bits showing a name of maker, an attribute (camera, scanner).

An attribute, which shows whether the device is an input device or an output device, is registered to a column C4 of device attribute. The characteristic of data, which the device can handle, for example, monochrome or color is registered to a column C5 of data attribute.

Next, an operation of the above-configured information appliance network will be described.

Figure 4:
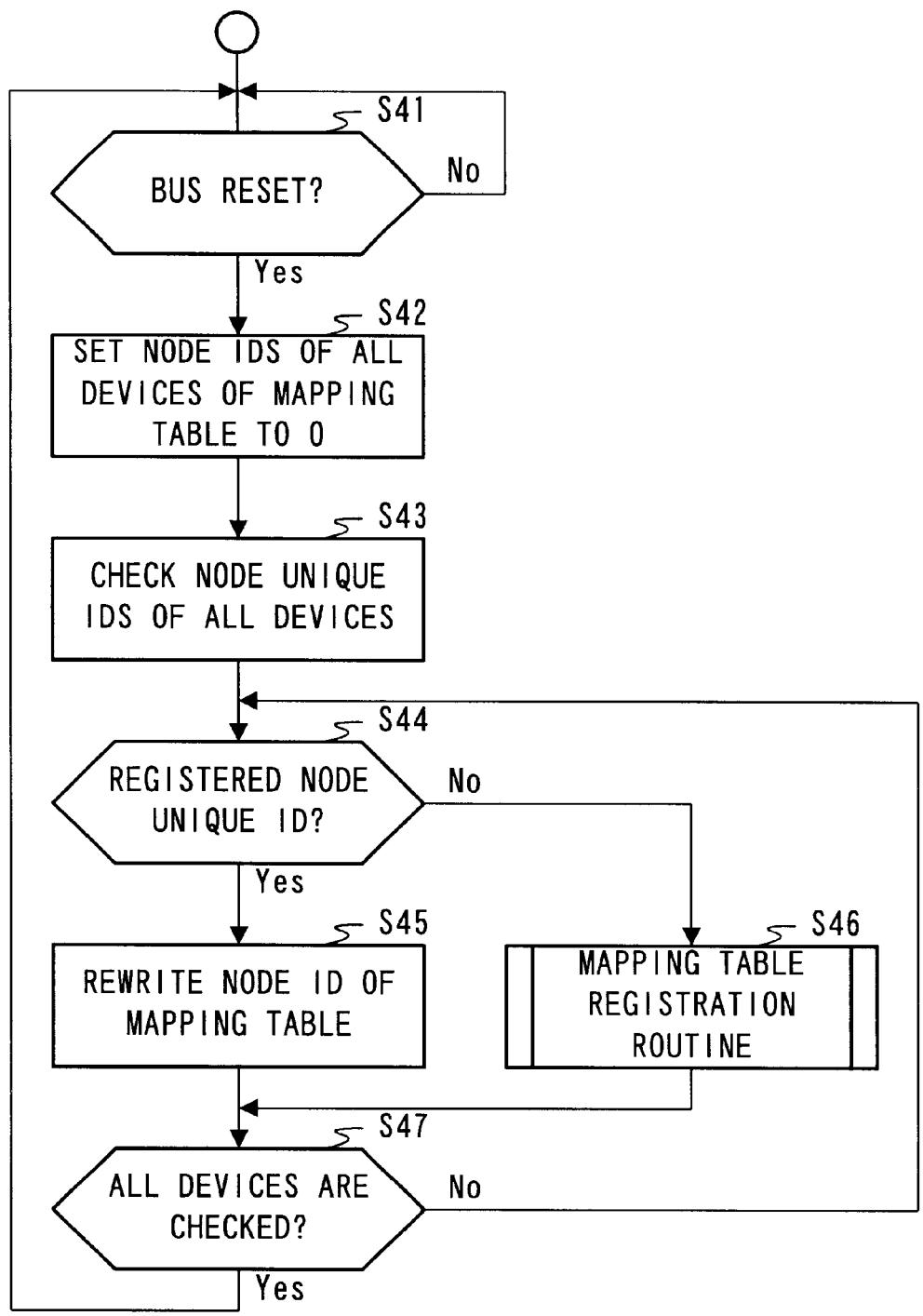
FIG. 4 is a flowchart when a bus reset occurs in IEEE1394 bus in the above embodiment.

First, an update operation of mapping table, which is executed when the bus reset occurs in IEEE1394 bus 8, will be explained with reference to FIG. 4.

When the bus reset occurs in IEEE1394 bus 8 (S41), node IDs are updated to all devices connected to all devices connected to IEEE1394 at this time. The bus reset occurs if a device is newly connected or the connected device is detached in a power-on state.

The CPU 26 manages the mapping table 30. The CPU 26 sets node IDs to 0 with respect to all devices registered to the mapping table 30 (S42).

Next, node unique IDs of all devices, which are currently connected to IEEE1394 bus 8, are checked (S43). The device, which is compliant wit the IEEE1394, holds the node unique ID. The bus manager collects node unique IDs of all devices after the occurrence of bus rest. The CPU 26 can obtain node unique IDs of all devices from the bus manager. Or, the CPU 26 can directly fetch node unique IDs of all devices from the IEEE1394 bus 8.

The CPU 26 determines whether or not unique IDs, which have been obtained from the bus manager or IEEE1394 bus 8, are registered in the mapping table 30 (S44). If it determined that all unique IDs are registered in the mapping table 30 in step S44, the operation goes to step S45 and a node ID assigned after the bus rest is written to the column C1 of node ID of the mapping table 30 (S45).

On the other hand, if there is any node ID, which is not registered in the mapping table 30, in the unique IDs obtained from the bus manager or IEEE1394 bus 8, the operation goes to step S45 and a new registration is performed in the mapping table 30. The device, which has a node unique ID unregistered in the mapping table 30, is one that is newly connected at the bus rest time. In step S46, information of the newly connected device (subaddress, node ID, node unique ID, terminal attribute, data attribute) is registered to the mapping table 30.

Figure 5:
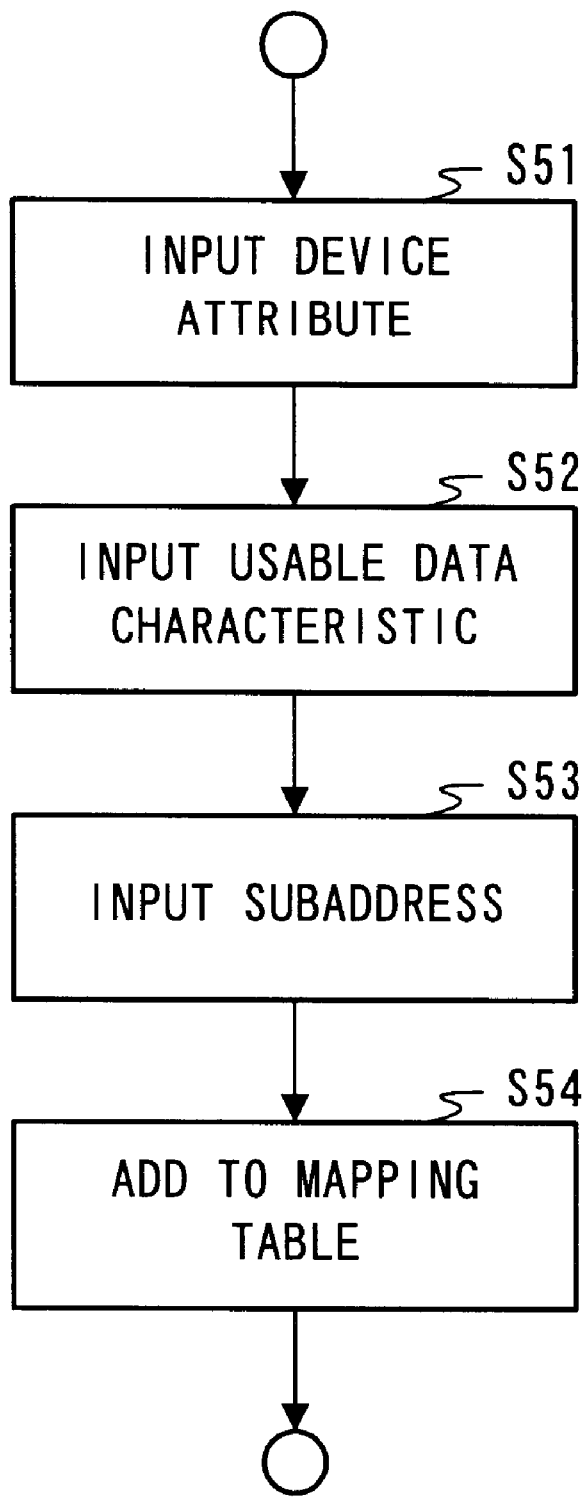
FIG. 5 is a flowchart relating to a registration routine of the mapping table.

FIG. 5 is a flowchart for registering the device to the mapping table 30. The CPU 26 calls a registration routine when a registration request is input from the control section 35 of the facsimile controlling apparatus 1 or the remote controlling device 36. In the registration routine, a message, which urges the input of terminal attribute of the corresponding device, is displayed and data, which is input in response to this message, is captured as a terminal attribution (S51). Sequentially, a message, which urges the input of data characteristic, is displayed and data, which is input in response to this message, is captured as a data characteristic (S52). Moreover, a message, which urges the input of subaddress, is displayed and data, which is input in response to this message, is captured as a subaddress (S53).

Then, the CPU 26 reserves a column for registering information of a device, which is newly connected, at the lowest position of the mapping table 30. Information captured in steps S51 to S53 and a node unique ID are written to this reversed column (S54). The user inputs the terminal attribute, data characteristic, subaddress from the control section 35 of the facsimile controlling apparatus 1 or the remote controlling device 36.

Finally, it is confirmed that necessary information with respect to all devices is registered in the mapping table, and processing is ended.

This allows node unique IDs of all devices connected to IEEE1394 and new node IDs to be associated with each other and registered in the mapping table 30 after the bus reset.

As mentioned above, in the facsimile controlling apparatus 1, every time when the node ID is updated in accordance with the occurrence of bus reset, the updated node IDs and the fixed node unique IDs are associated with other.

Figure 6:
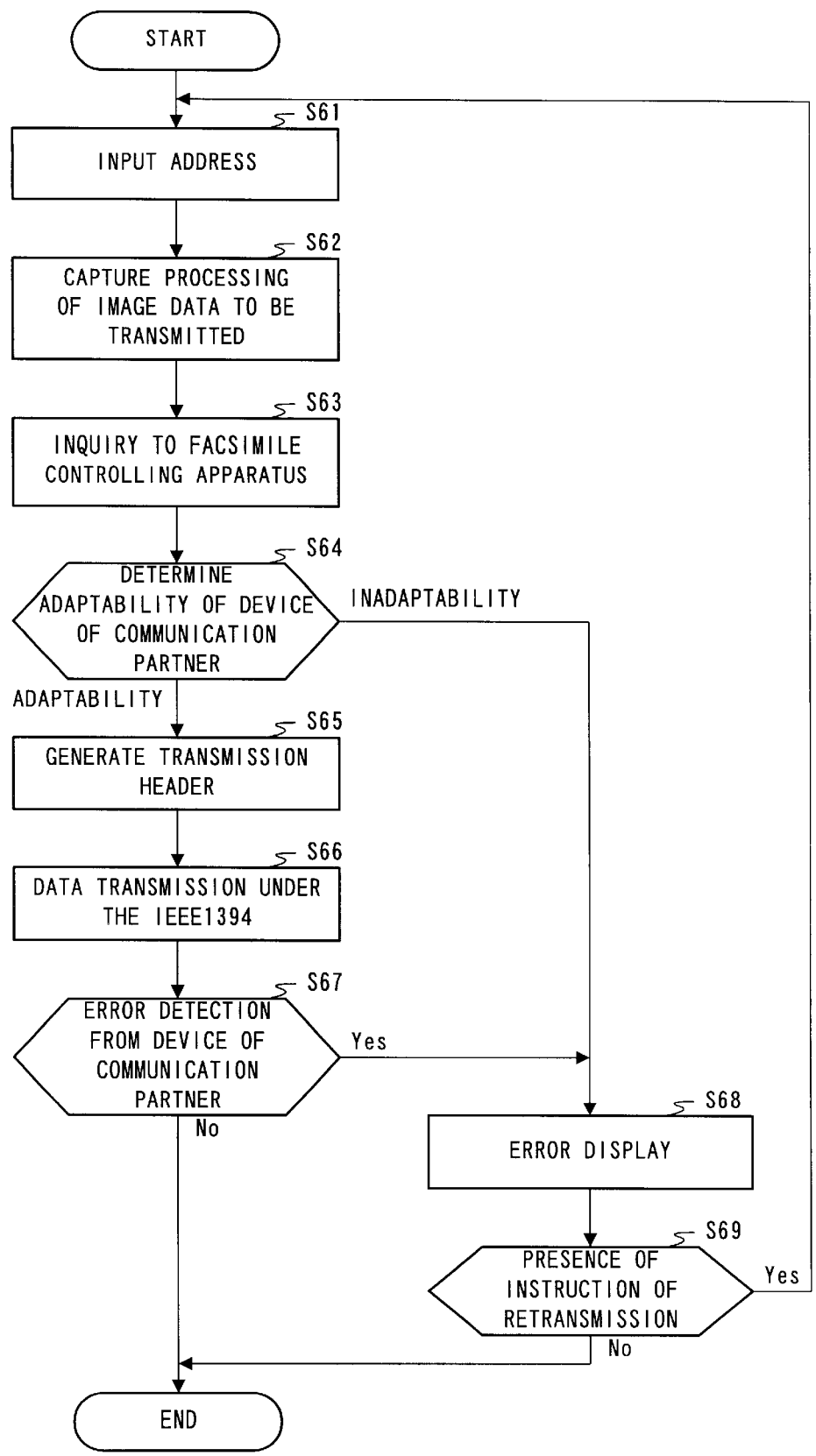
FIG. 6 is a flowchart of data transmission in IEEE1394 bus in the above embodiment.

Next, operations of data transmission and data reception using the devices connected to IEEE1394 bus 8 will be explained. FIG. 6 is a flowchart of data transmission. The following will explain a case in which image data is transferred from the device 7 to the printer 5.

In the sender device 7, the subaddress of printer 5, serving as a recipient, is input from the panel section 11 by the user (S61). If there is no operation section for inputting the subaddress (destination) in the sender device 7, a recipient subaddress may be input from the control section 35 of the facsimile controlling section 1. In this case, a transmission header to the reception device can be generated by the facsimile controlling apparatus. The input of recipient subaddress is carried out by the facsimile controlling apparatus 1, and the creation of transmission header may be carried out by the sender device. In this case, the recipient subaddress is transmitted from the facsimile controlling apparatus 1 to the sender device.

Next, an image of an original to be transmitted is scanned (S62). In a case where the number of originals to be transmitted is two or more, the images of all originals are captured before pre-transmission. Transmitting image data is stored into the image memory 12.

The capture of image data is ended in step S62, the device 7 sends inquiries to the facsimile controlling apparatus 1 about various kinds of information to be described later via IEEE1394 bus 8 (S63). The inquiry in step S63 is performed by transmitting an inquiry request, which has node unique IDs, which are stored in the memory built in the device 7, and recipient subaddress added therein, to the facsimile controlling apparatus 1.

In the facsimile controlling apparatus 1, IEEE1394 controller 31 captures the inquiry request from IEEE1394 bus 8. The CPU 26 captures subaddress, current node IDs and data characteristic of the device 7, serving a sender, from the mapping table 30 using the user unique ID added to the inquiry request. Moreover, the CPU 26 captures current node IDs and data characteristic of the printer 5, serving a recipient, from the mapping table 30 using the recipient subaddress added to the inquiry request. Data thus taken out of the mapping table 30 is transmitted to the device 7 serving as a sender.

The device 7, serving as a sender, captures information, which the facsimile controlling apparatus 1 has transmitted in response to the inquiry, from IEEE1394. The sender device 7 compares the data characteristic of the sender device 7 obtained by the above inquiry with the data characteristic of the recipient printer 5 so as to determine adaptability therebetween (S64). For example, it is assumed that the data characteristic of device 7 is color and that the data characteristic of printer 5 is monochrome. Even in a case where the device 7 transmits a color image, the printer 5 cannot such as a case. In this case, Conversely, in a case where the data characteristic of device 7 is monochrome and that of printer 5 is monochrome, the sender device 7 determines the printer 5 as adaptability.

If the sender device 7 determines the printer 5 as inadaptability in step S64, the sender device 7 performs an error display (S68). In step S68, a message to the effect that the reception device is incompatible is displayed on the display section provided in the device 7. The display of inadaptability may be carried out such that an error number is displayed. If an instruction of retransmission is input from the user (S69), the operation goes to step S61 and the operation is started from the input of address.

Figure 10:
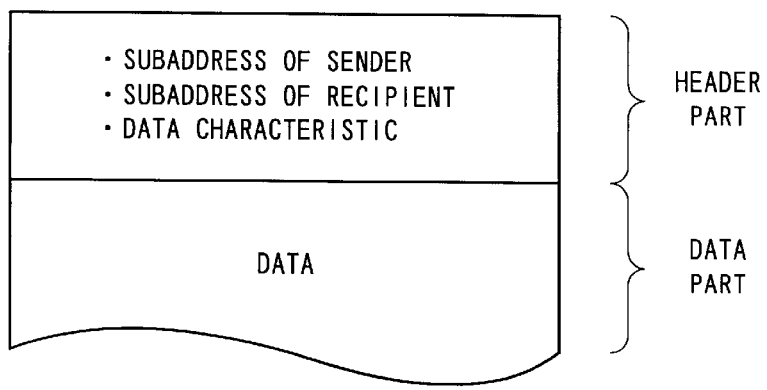
FIG. 10 is a frame configuration view of transmission data.

While, if the sender device 7 determines the printer 5 as adaptability in step S64, the sender device 7 generates a transmission header (S65). A data form of transmission data is shown in FIG. 10. The subaddress of sender device 7 obtained in step S63, subaddress of recipient printer 5 and data characteristic of transmission data are set in the transmission header. The subaddress of recipient is thus put in the transmission head, so that the recipient can detect misdelivery even if the node ID is changed during transmission.

Transmission data with the image data stored in the image memory 12 is IEEE1394 transmitted to the transmission header generated in step S65 (S66). In data transmission of IEEE1394, a sender node ID and a recipient node ID are added to the header of a packet carrying transmission data. These node IDs are information that has been obtained in step S64.

After data transmission in step S66, if an error notification is sent from the recipient printer 5, the operation moves to step S68 to display an error. If no error notification is sent from the recipient printer 5, this means that normal transmission is carried out, so that a series of transmission processing is ended.

Figure 7:
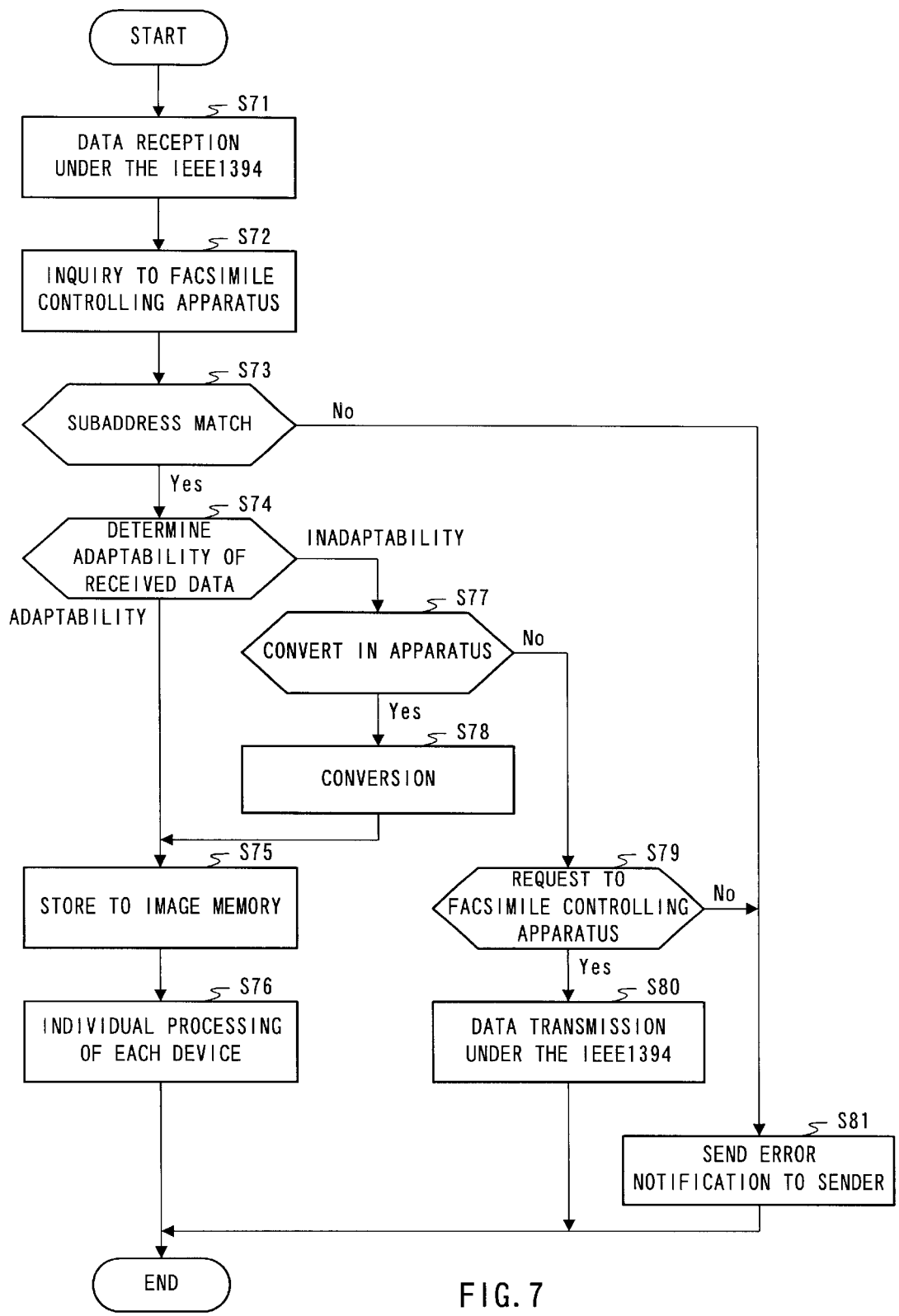
FIG. 7 is a flowchart of data reception in IEEE1394 bus in the above embodiment.

FIG. 7 is a flowchart of data reception. The recipient printer 5 captures a packet send to the printer 5 from the IEEE1394 bus 8 (S71). The IEEE1394 controller of printer 5 captures the packet in which the node ID assigned to the current printer 5 is described in the header of packet as a recipient.

The printer 5 sends inquiries to the facsimile controlling apparatus 1 about destination information of printer 5 and data characteristic in order to determine whether or not the captured packet is appropriate data for the printer 5 (S72). For this reason, the printer 5 reads a node unique ID stored in the built-in memory and sends an inquiry packet having the read node unique ID embedded therein to the facsimile controlling apparatus 1.

The facsimile controlling apparatus 1 captures the inquiry packet from the IEEE1394 bus 8. The CPU 26 fetches the node unique ID from the inquiry packet and extracts the subaddress of printer 5 and the data characteristic from the mapping table 30 using the fetched node unique ID. The subaddress of printer 5 and the data characteristic extracted from the mapping table 30 are transmitted over the IEEE1394 bus 8 in the form of a packet with a node ID directed to the printer 5.

The printer 5 captures the packet, which carries the subaddress of printer 5 and the data characteristic, from the IEEE1394 bus 8. The printer 5 compares the subaddress of printer 5 sent from the facsimile controlling apparatus 1 with the recipient subaddress included in the packet captured in step S71 (S73).

Since the subaddress is unchanged even if the bus reset occurs, it is possible to confirm that the packet captured in step S71 is one that is directed to the printer 5 if these subaddresses match.

The printer 5 captures the packet having the same node ID as the current node ID of printer 5 in step S71. However, if the bus reset occurs after creating the header of the packet, there is a possibility that the node ID, which is different from one at the header creating time, will be assigned as a node ID of printer 5. In the case where the different node ID is assigned, there is a possibility that the device other than the printer 5 will capture the packet erroneously. In the embodiment of the present invention, since the subaddress is checked, such a misdelivery can be detected by the recipient side.

Figure 11:
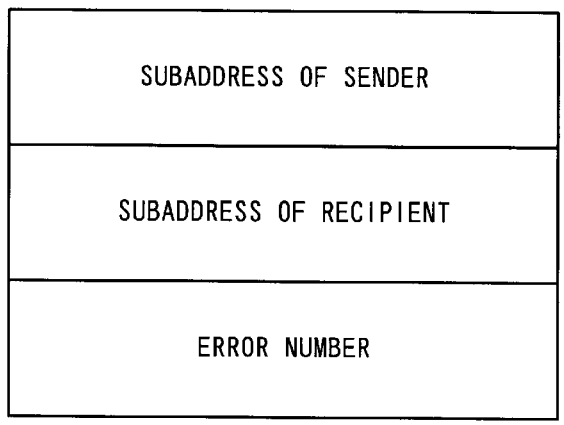
FIG. 11 is a frame configuration view of an error notification.

If these subaddresses do not match in step S73, the printer 5 sends an error notification to the sender device 7 (S81). For this reason, the printer 5 generates a transmission header for error notification shown in FIG. 11. Then, the sender subaddress (printer 5), recipient subaddress (device 7), and an error number are set in the transmission header for error notification. The error number indicates a subaddress mismatch. The error number may be embedded into not only the transmission header but also the data section. The subaddress of sender device 7 is extracted from the received packet. The error notification with such a transmission header is sent to the sender device 7.

On the other hand, if the subaddresses match and are determined as data directed to the printer 5 in step S73, adaptability of received data is determined (S74). Then, adaptability between the data characteristic of received data and that of printer 5 is determined. The data characteristic of received data is inserted to the transmission header of received data. The data characteristic of printer 5 is obtained in step S72.

In a case where received data is adaptable to the data characteristic of printer 5, received data is stored in the image memory of printer 5 (S75), and at an appropriately later time, received data is read from the image memory and processing inherent in the device is executed (S76). In the case of printer 5, received data is printed.

However, if the result of inadaptability is obtained in step S74, the operation goes to step S77, and it is determined whether or not the printer 5 can obtain adaptability by itself. For example, if the printer 5 has the function, which is equivalent to that of the media converting section 34, the printer 5 performs media conversion (S78). In other words, a color image is converted to a monochrome image. Or, a voice signal is converted to a character and the character is further converted to a bit map image to print.

Moreover, if the printer 5 cannot obtain adaptability by itself, the operation goes to step S79 and it is determined whether or not a request to the facsimile controlling apparatus 1 should be carried out (S79). The data characteristic, which can be converted by the facsimile controlling apparatus 1, is registered in the printer 5 in advance, and the printer 5 sends a request to the facsimile controlling apparatus 1 only when the data characteristic of received data is the registered data characteristic (S80). Or, the printer 5 sends an inquiry to the facsimile controlling apparatus 1 about convertibility or inconvertibility, and transmits a request to the facsimile controlling apparatus 1 when permission is obtained from the facsimile controlling apparatus 1.

In a case where no request is sent to the facsimile controlling apparatus 1 in step S79, the printer 5 sends an error notification to the sender device 7 in the same manner as the above (S81).

Figure 8:
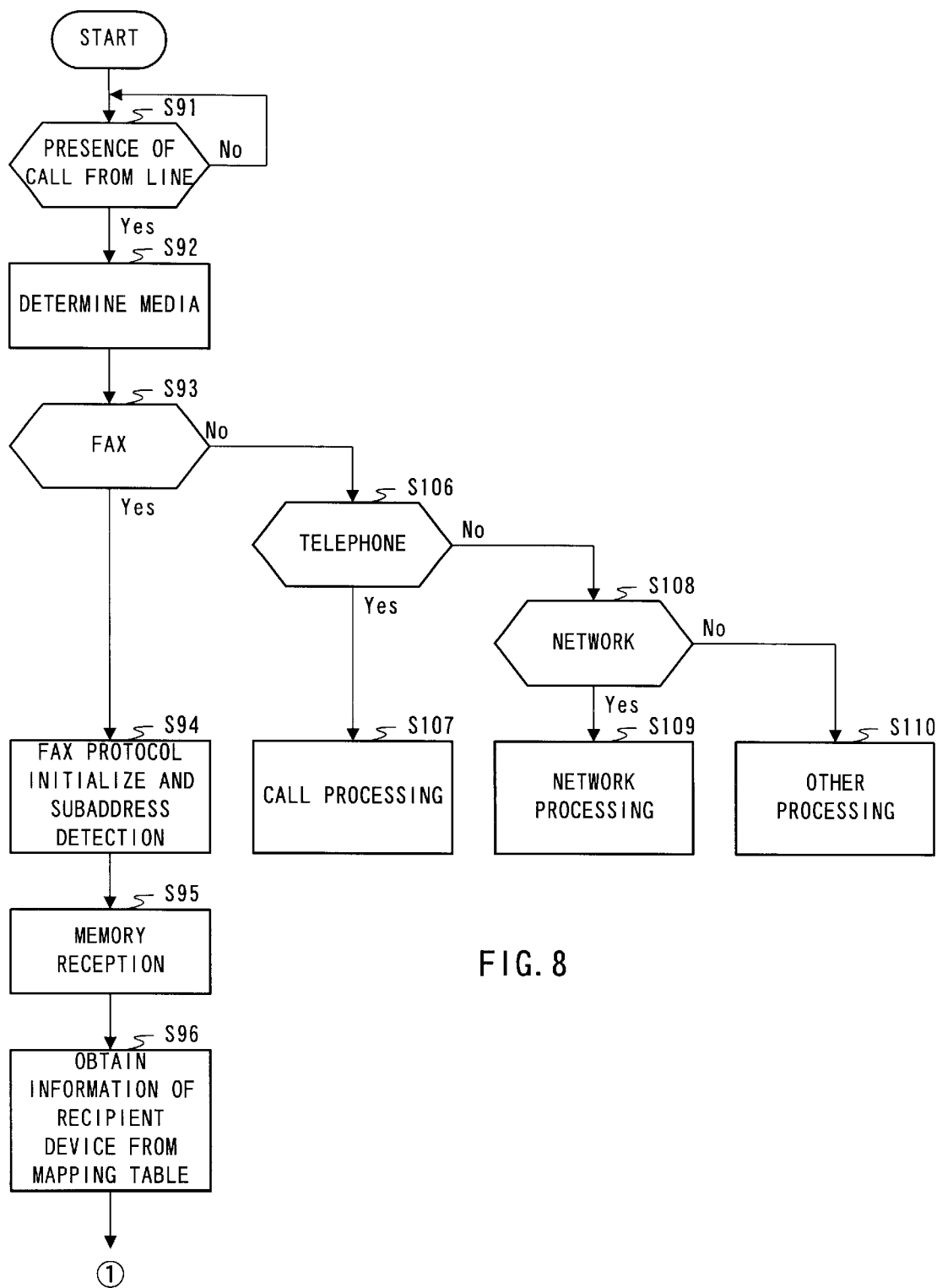
FIG. 8 is a flowchart of a first part when a FAX reception from an outer line is performed in the above embodiment.
Figure 9:
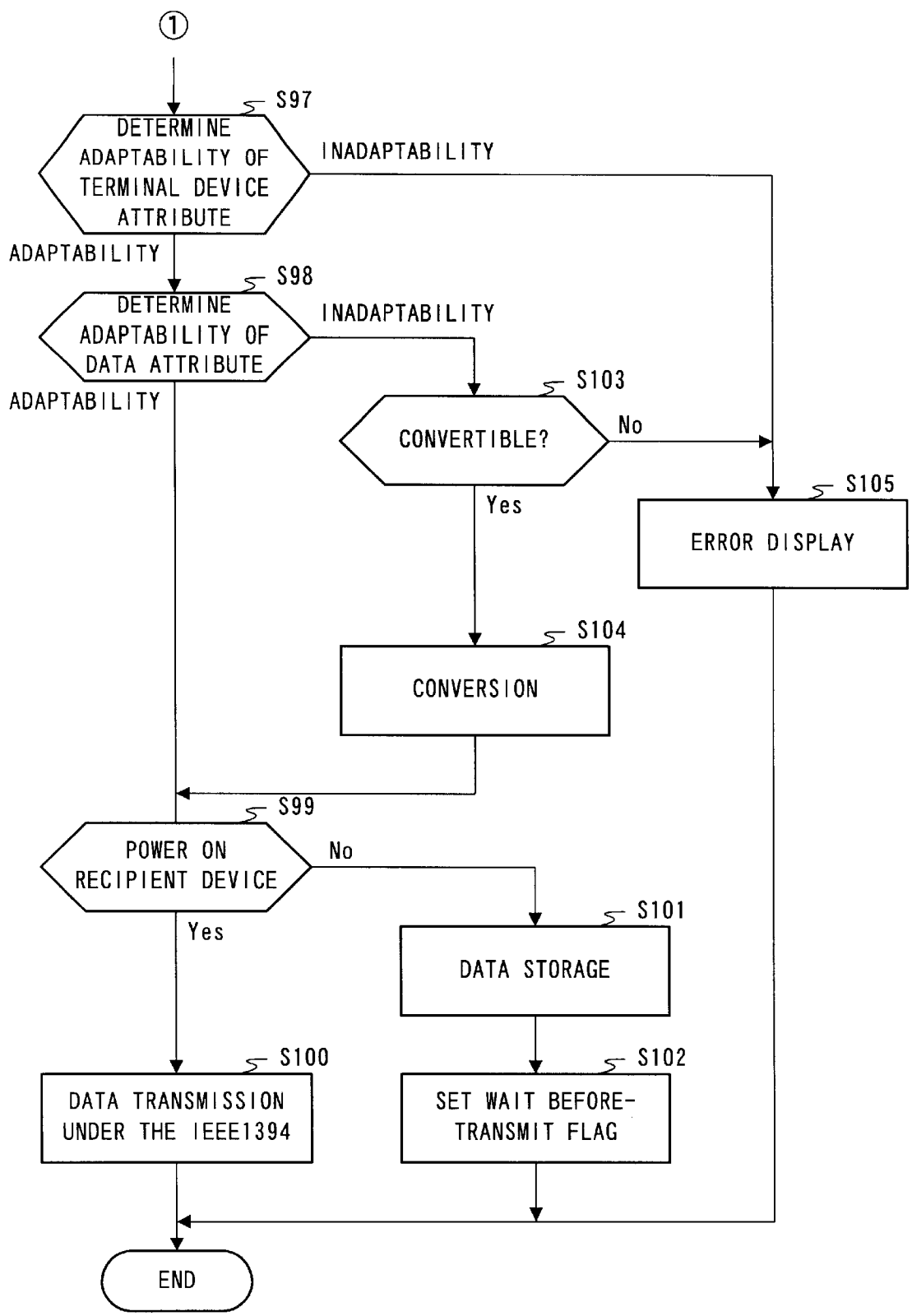
FIG. 9 is a flowchart of a second part when a FAX reception from an outer line is performed in the above embodiment.

Next, an operation, which is performed when data is received from the line, will be explained with reference to FIGS. 8 and 9. If there is an incoming call in NCU 21 (S91), a signal received by NCU 21 is converted to a digital signal, and the digital signal is output to the media determining section 23.

The media determining section 23 analyzes the received signal to determine communication media to be used (S92). The media include facsimile communications, telephone communications, and network communications. In the case of facsimile communications, the detection of CNG included in a control signal, which is sent before image communications are started, allows the media to be determined as facsimile communications.

In the case where the media is determined as facsimile communications in step S93, the received signal is given to the FAX controlling section 24. The fax controlling section 24 executes protocol for facsimile communications to detect a subaddress and receive an image (S94). The subaddress indicates one for reception device, and it is designated by the sender device.

The CPU 26 stores the images received in step S94 to a given area in RAM 29, sequentially (S95). Moreover, the CPU 26 searches information (node ID, terminal attribute, data attribute) of the device, which has the detected subaddress, from the mapping table 30 (S96). By use of this searching result, adaptability and power condition are determined.

First, adaptability of the terminal attribute of device, serving as a recipient, is determined (S97). For example, if the sender is a scanner in spite of the fact that the image is received, the device terminal attribute is determined as inadaptability. This is because the scanner cannot deal with the image even if it is sent.

If the device terminal attribute is determined as adaptability in step S97, the CPU 26 further determines whether the data characteristic is adaptability or inadaptability (S98). For example, if the received image is a color image and the reception device is a color image-capable device, the data characteristic is determined as adaptability. While, if the received image is a color image but the reception device cannot deal with the color image, the data characteristic is determined as inadaptability.

In a case where the data attribute is determined as adaptability in step S98, the CPU 26 further determines whether or not the power of reception device is on. In the devices connected to the IEEE1394 bus 8, there is one that is not powered on. The node ID of the device that is not powered on is not registered in the mapping table 30. In a case where a node ID is not included in information of the reception device, which has been captured from the mapping table 30, in step S96, it is determined that power is OFF.

After confirming that the power of the reception device is ON, the CPU 26 executes data transmission in conformity with protocol for IEEE1394 (S100). In other words, the CPU 26 generates a transmission header shown in FIG. 10, and adds the generated transmission header to the received image stored in step S95. In the transmission header, the subaddress of facsimile controlling apparatus 1 is described as a sender subaddress and the subaddress detected in step S94 is described as a recipient subaddress. Then, by use of the packet in which the node ID of facsimile controlling apparatus 1 is used as a sender and the node ID of the device having the recipient subaddress is used as a recipient, transmission data, which comprises the above-mentioned transmission header and image, is transmitted.

If it is determined that power is OFF in step S99, the image stored in step S95 is moved to a given area (S101). Then, a wait before-transmit flag is set in order to transmit the image when the power of the device serving as a recipient is ON and processing is ended (S102). The CPU 26 checks the presence or absence of the wait before-transmit flag at a periodical timing or given timing. Then, if the wait before-transmit flag is set, the CPU 26 performs IEEE1394 transmission after confirming that power of the reception device is ON.

In a case where the data attribute is determined as inadaptability in step S98, the operation goes to step S103 and it is determined whether or not the media converting section 34 can convert the data attribute. For example, if the received image is a color image and the reception device is a device for a monochrome image, the media converting section 34 converts the color image to the monochrome image (S104).

In a case where the received image cannot be converted to the form that adapts to the data attribute of the reception device, the operation goes to step S105 to display an error. In this case, a message to the effect that the data attribute is inadaptable is displayed on the display section.

Moreover, in a case where the terminal attribute of the reception device is determined as inadaptability in step S97, the operation goes to step S105, an error display is performed. In this case, a message to the effect that the terminal attribute is inadaptable is displayed on the display section.

Additionally, if it is determined that the media is not facsimile communications in step S93, the operation goes to step S106 to determine whether or the media is telephone communications. If the media is the telephone communications, call processing is executed by the telephone 9 (S107). Moreover, if it is determined that the media is not telephone communications in step S106, the operation goes to step S108 to determine whether or the media is network communications. If the media is the network communications, network processing is executed by the network processing section 25 (S109). In the case of the other media, the operation goes to step S110 and desired processing is carried out. In a case where data received via network communications is transferred to the device over the IEEE1394 bus 8, the same processing as that of facsimile reception is carried out.

Figure 12:
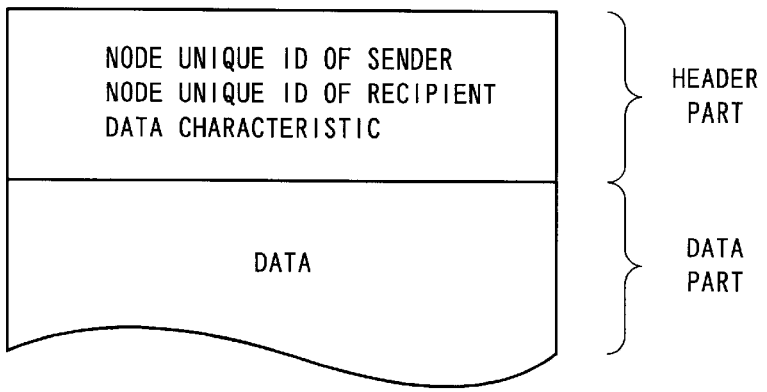
FIG. 12 is a frame configuration of transmission data according to a modification.

In the above explanation, the subaddress is set to the transmission header in data transmission over the IEEE1394 bus 8. However, the node unique ID may be used in place of the subaddress. FIG. 12 shows a data format when the node unique ID is used. Since the node unique ID is not changed by the bus reset similar to the subaddress, the same effect as the case using the subaddress can be obtained.

Though the node unique ID can be obtained from the mapping table 30 as in the case of the subaddress, the node unique ID may be read from the memory of the device to use since it is stored in the memory of each device at the time of shipment.

Moreover, in the above explanation, the management of serial bus is executed by the facsimile controlling apparatus connected to the outer line. However, the above terminal management using the mapping table may be carried out by information processing devices such as a personal computer connected to IEEE1394 bus 8, workstation, scanner, and the like, excepting data processing between the device and the outer line.

The present invention is not limited to the above described embodiments, and various variations and modifications may be possible without departing from the scope of the present invention.

This application is based on the Japanese Patent Application No.HEI11-226300 filed on Aug. 10, 1999, entire content of which is expressly incorporated by reference herein.

What is claimed is:

1. A communication controlling apparatus, which is connected to both a serial bus to which a plurality of terminal devices are connected and to a telephone line, said communication controlling apparatus comprising:
   a mapping table that stores a fixed address, associated with a terminal device, and a node ID assigned to the terminal device, which is connected to a current serial bus, in association with each other;
   an obtainer that obtains a node ID of a reception terminal device that is a recipient of information data received via the telephone line, from said mapping table;
   a transmitter that transmits the information data received via the telephone line to the reception terminal device via the serial bus using the obtained node ID;
   a determiner that determines a media to which the information data received via the telephone line belongs;
   a facsimile controller that executes a control for facsimile communications when said media of the received information data belongs to a facsimile; and
   a network controller that executes control for computer network communications when said media of the received information data belongs to a network.

2. The communication controlling apparatus according to claim 1, wherein when a bus reset occurs in the serial bus, the node ID previously stored in said mapping table is rewritten to a node ID updated with respect to the terminal device connected to the serial bus after the bus reset.

3. The communication controlling apparatus according to claim 1, wherein the fixed address stored in said mapping table is a subaddress, which a sender device serving as an originator, can designate to said communication controlling apparatus via the telephone line.

4. The communication controlling apparatus according to claim 1, wherein said mapping table stores, in association with the fixed address, a data characteristic indicating data for which the terminal device can perform processing.

5. The communication controlling apparatus according to claim 4, further comprising an analyzer that analyzes adaptability between said received information data and the data characteristic of the reception terminal device.

6. The communication controlling apparatus according to claim 1, wherein said mapping table stores, in association with the fixed address, a device attribute indicating an attribute of the terminal device.

7. The communication controlling apparatus according to claim 6, further comprising an analyzer that analyzes adaptability between said received information data and a device attribute of the reception terminal device.

8. The communication controlling apparatus according to claim 1, further comprising a converter that performs data conversion to adapt received information data to a data characteristic of the reception terminal device.

9. The communication controlling apparatus according to claim 1, further comprising a processor that responds to an inquiry from the terminal device connected to said serial bus.

10. The communication controlling apparatus according to claim 1, wherein the serial bus is a high-speed serial bus that operates based on IEEE1394.

11. A communication controlling apparatus, which is connected to both a serial bus to which a plurality of terminal devices are connected and to a telephone line, said communication controlling apparatus comprising:
    a mapping table that stores a fixed address associated with a terminal device, and a node ID assigned to the terminal device, which is connected to a current serial bus in association with each other;
    an obtainer that obtains a node ID of a reception terminal device that is a recipient of information data received via the telephone line, from said mapping table;
    a transmitter that transmits the information data received via the telephone line to the reception terminal device via the serial bus using the obtained node ID; and
    a processor that responds to an inquiry from the terminal device connected to the serial bus,
    wherein said mapping table stores a data characteristic indicating data for which the terminal device can perform processing and a device attribute indicating an attribute of the terminal device, each of said data characteristic and said device attribute being associated with the fixed address, and
    wherein said processor fetches at least one of the fixed address, data characteristic and device attribute from the mapping table in response to the inquiry from the terminal device connected to the serial bus, and transmits the fetched data to the inquiring terminal device.

12. A communication system including a communication controlling apparatus, which is connected to both a serial bus to which a plurality of terminal devices are connected and to a telephone line, said communication controlling apparatus comprising:
    a mapping table that stores a fixed address associated with a terminal device, and a node ID assigned to the terminal device, which is connected to a current serial bus in association with each other;
    an obtainer that obtains a node ID of a reception terminal device that is a recipient of information data received via the telephone line, from said mapping table;
    a transmitter that transmits the information data received via the telephone line to the reception terminal device via the serial bus using the obtained node ID; and
    a processor that responds to an inquiry from the terminal device connected to said serial bus,
    wherein the terminal device comprises:
        an inquirer that sends an inquiry to said communication controlling apparatus regarding a fixed address of a reception terminal device;
        a creator that generates a transmission header in which the fixed address of reception terminal device, that serves as a destination is embedded, the fixed address being obtained from said communication controlling apparatus; and a transmitter that transmits information data, in which the generated transmission header is included, to the reception terminal device via the serial bus.

13. A communication system including a communication controlling apparatus, which is connected to both a serial bus to which a plurality of terminal devices are connected and to a telephone line, said communication controlling apparatus comprising:

a mapping table that stores a fixed address associated with a terminal device, and a node ID assigned to the terminal device, which is connected to a current serial bus in association with each other;

an obtainer that obtains a node ID of a reception terminal device that is a recipient of information data received via the telephone line, from said mapping table;

a transmitter that transmits the information data received via the telephone line to the reception terminal device via the serial bus using the obtained node ID; and a processor that responds to an inquiry from the terminal device connected to said serial bus, wherein the terminal device comprises:

a system capturer that temporarily captures information data, in which the same node ID as that of said terminal device is set as a destination, from a data stream of the serial bus;

an inquirer that sends an inquiry to said communication controlling apparatus about a fixed address of said terminal device when the information data is temporarily captured from said serial bus; and a comparator that compares the fixed address of said terminal device, which is obtained from said communication controlling apparatus, with a fixed address of a reception terminal device, which is embedded in a transmission header, and, when an address match occurs, utilizes the compared fixed address to direct the information data to said reception terminal device.

14. The communication system according to claim 13, wherein said mapping table of said communication controlling apparatus stores a data characteristic showing data for which the terminal device can perform processing in association with said fixed address, said terminal device further comprising:

a determiner that determines adaptability between the data characteristic of said terminal device, which is obtained from said communication controlling apparatus, and the data characteristic of information data, which is embedded in a transmission header, and when adaptability is determined, utilizes the data characteristic to direct information data to said terminal device.

15. A serial bus managing apparatus for controlling a serial bus to which a plurality of terminal devices are connected, said serial bus managing apparatus comprising:

a bus controller connected to the serial bus;

a mapping table that relates node IDs of each of the terminal devices, which are connected to the serial bus, with fixed addresses, said mapping table stores at least one of a data characteristic, which indicates information data for which each terminal device can perform processing, and a device characteristic, which indicates an attribute of each terminal device, in association with the fixed address of the terminal device;

a rewriter that rewrites the node ID of said mapping table to a changed node ID when the node ID is changed by occurrence of a bus reset; and a controller that manages the terminal devices connected to said serial bus based on said mapping table.

16. A communication controlling method comprising:

receiving an inquiry about a fixed address of a reception device from a sender device connected to a serial bus;

obtaining the node ID of the reception device from a mapping table, which relates a fixed address, associated the terminal device to a node ID assigned to a terminal device connected to the current serial bus; and transmitting the obtained fixed address to the sender device via the serial bus, wherein at least one of a data characteristic and a device characteristic is stored in said mapping table in association with the fixed address of each terminal device, and at least one of the data characteristic and the device characteristic is transmitted in response to the inquiry received from the sender device.

17. A method of controlling a communication apparatus which is connected to both a serial bus and to a telephone line, a plurality of terminal devices being connected to the serial bus, the method comprising:

storing a fixed address associated with a terminal device and a node ID assigned to the terminal device which is connected to a current serial bus in association with each other;

obtaining a node ID of a reception terminal device, that is a recipient of information data received via the telephone line, from the mapping table;

transmitting the information data received via the telephone line to the reception terminal device via the serial bus, using the obtained node ID;

determining a media to which the received information data from the telephone line belongs;

controlling a facsimile communication when the media of the received information data belongs to a facsimile; and controlling a computer network communication when the media of the received information data belongs to a network.

* * * * *

UNITED STATES PATENT AND TRADEMARK OFFICE
CERTIFICATE OF CORRECTION

PATENT NO. : 6,658,517 B1
DATED : December 2, 2003
INVENTOR(S) : M. Niimi et al.

It is certified that error appears in the above-identified patent and that said Letters Patent is hereby corrected as shown below:

Column 13,
Line 23, before "capturer" delete "system".

Signed and Sealed this

Twenty-seventh Day of April, 2004

JON W. DUDAS
*Acting Director of the United States Patent and Trademark Office*